United States Patent [19]
Pearson

[11] Patent Number: 5,718,043
[45] Date of Patent: Feb. 17, 1998

[54] AUTOMATED ASSEMBLY OF TORQUE CONVERTERS TO TRANSMISSIONS

[75] Inventor: Thomas E. Pearson, Grosse Ile, Mich.

[73] Assignee: Ford Global Technologies, Inc., Dearborn, Mich.

[21] Appl. No.: 363,851

[22] Filed: Dec. 27, 1994

[51] Int. Cl.$^6$ ..................................... B23P 15/00
[52] U.S. Cl. .................. 29/889.5; 29/407.09; 29/407.1; 29/464; 29/714
[58] Field of Search .................... 29/407.09, 407.1, 29/434, 714, 464, 889.5

[56] References Cited

U.S. PATENT DOCUMENTS

| | | |
|---|---|---|
| 4,145,802 | 3/1979 | d'Auria . |
| 4,502,279 | 3/1985 | Fuehrer . |
| 4,538,333 | 9/1985 | Cettl . |
| 4,594,762 | 6/1986 | Och . |
| 4,640,294 | 2/1987 | Ordo ............................... 29/464 |
| 4,843,708 | 7/1989 | Yokoi et al. . |
| 4,887,344 | 12/1989 | Kurihara et al. ............. 29/468 |

FOREIGN PATENT DOCUMENTS

| | | |
|---|---|---|
| 1437003 | 5/1976 | United Kingdom . |
| 1450788 | 9/1976 | United Kingdom . |

*Primary Examiner*—Larry I. Schwartz
*Assistant Examiner*—Marc W. Butler
*Attorney, Agent, or Firm*—Donald A. Wilkinson

[57] ABSTRACT

A method to automatically align internal splines (20) of a torque converter (16) to mating external splines (18) of a transmission subassembly (14) during the assembly of the torque converter (16) to the transmission subassembly (14). The apparatus includes a robotic end effector assembly (26) coupled to an arm (22) of a robot (24). The end effector assembly (26) includes a counterbalance mechanism, such as spring assemblies (62) and a position sensor (64) that provide for a reduced effective weight of the torque converter (10) to allow the splines to align and detect if the splines are not properly aligned. Upon sensing non-engagement, robot (24) lifts, rotates and lowers the torque converter (16) until the position sensor (64) detects alignment of the mating splines.

2 Claims, 3 Drawing Sheets

AUTOMATED ASSEMBLY OF TORQUE CONVERTERS TO TRANSMISSIONS

FIELD OF THE INVENTION

The present invention relates to the automated assembly of components, having multiple mating splines, in vehicle transmissions, and more particularly to the assembly of a torque converter to a transmission subassembly. This application is related to co-pending patent application titled AUTOMATED ASSEMBLY OF TRANSMISSION COMPONENTS, filed herewith.

BACKGROUND OF THE INVENTION

During the assembly of an automatic transmission, a torque converter assembly is assembled to a transmission subassembly. In order to accomplish this assembly process, the internal splines of the torque converter must be aligned with the external splines of the transmission subassembly as the two are brought together. Currently, this process is generally done by hand. A person picks up a torque converter from a bin, carries it over to a transmission, lowers it down with the torque converter generally centered about the transmission splines, and then manipulates it until all of the splines align and the torque converter drops into place. This is a time consuming and thus expensive process, which allows for damage to components if dropped rather than set into place during assembly. This is especially true for the heavier torque converters used in automatic transmissions driven by large engines, such as those on large cars and light trucks.

Consequently, there is a desire to mechanically pick, place and align splines of a torque converter assembly while assembling it to a transmission subassembly. However, due to the fact that several splines must all be aligned properly during assembly, with some of the splines able to freely rotate, spline alignment has proven difficult to automate. Again, particularly true for the heavier torque converters, since, when the splines of the heavier torque converter do not align and come to rest on the transmission subassembly splines, the weight can cause the two to "lock-up" relative to one another. By "lock-up", one means that, even though not aligned and mating, when one spline is rotated, the other one rotates along with it even though they are only in end-to-end surface contact with one anther, thus preventing alignment.

One attempted solution to automatically assemble these components is to first pre-align all of the splines, both complete axial and rotational alignment, and then hold the alignments in place during assembly. This is very time consuming, and it is difficult to maintain the alignment, and so the desire is to avoid this total pre-alignment type of process.

In order to avoid having to totally pre-align all of the splines, another attempted solution provides an automated system with processing capabilities that allow for the detection of non-engagement or engagement of splines during spline alignment assembly by using force feedback sensing technology. However, the technology required for force feedback end effectors on robots is very expensive to incorporate into a system and is also slow, due to the significant sensor and computer capabilities required; also making it impractical. Further, it does not address the concern with lock-up of the splines.

There is a desire, then, for an automated assembly system that will minimize the cost and complexity of the assembly system while still allowing for a short cycle time when assembling the torque converter to the transmission subassembly, particularly for heavier torque converters.

SUMMARY OF THE INVENTION

In its embodiments, the present invention contemplates a robot end effector assembly adapted to mount to an arm of a robot for the assembly of a torque converter having an internal set of splines onto a vehicle transmission subassembly having an external set of mating splines during automated assembly of the torque converter to the vehicle transmission. The end effector assembly includes lift means for securing the torque converter to and aligning it with the remainder of the end effector assembly, and a connector plate for securing the end effector to the robot arm. An upper support shaft is affixed to the connector plate, and a lower support shaft is coupled to the upper support shaft and fixed to the lift means. The end effector assembly further includes counterbalance means for resiliently supporting the lift means relative to the upper support shaft such that limited movement of the lift means relative to the upper support shaft can occur, and position sensing means for monitoring the relative vertical position between the lift means and the upper support shaft.

The invention further contemplates an automated method of aligning splines of a torque converter with splines of a vehicle automatic transmission subassembly while assembling the torque converter to the transmission subassembly using an end effector assembly connected to an arm of a robot. The method comprises the steps of: engaging the torque converter with the end effector assembly; positioning the torque converter over the transmission subassembly with the splines of the torque converter substantially centered over the splines of the transmission subassembly; providing a counterbalance mechanism in the end effector assembly such that a limited amount of relative movement can occur between the robot arm and the torque converter and the torque converter is resiliently supported relative to the robot arm; providing sensing means such that the sensing means detects relative vertical position between the robot arm and torque converter; lowering the torque converter down onto the transmission subassembly until the sensing means detects a vertical change in relative position between the robot arm and torque converter; lifting the torque converter, rotating the torque converter and lowering the torque converter if the robot arm has not dropped a predetermined distance associated with full seating of the torque converter on the transmission subassembly until the sensing means detects a vertical change in relative position between the robot arm and torque converter; and repeating the lowering step and the lifting, rotating and lowering step until the robot arm has dropped the predetermined distance associated with a full seating of the torque converter.

Accordingly, an object of the present invention is to provide a system for automated assembly of a torque converter to a transmission subassembly using position feedback from the end effector and a counterbalance mechanism on the end effector to allow for alignment of multiple splines during the assembly process, with a short cycle time.

It is an advantage of the present invention that the end effector allows for automatic assembly of a complex spline system, by providing an inexpensive counterbalance mechanism, with position feedback, to provide for detection of non-engagement of splines, without lock-up, during the assembly process. The counterbalance off-weighs the torque converter-to-transmission spline contact to some predetermined weight. This allows for a reduction in the force induced by a static coefficient of friction associated with the weight; therefore, the splines will not lock-up and allow relative spline-to-spline motion resulting in spline alignment during assembly.

DETAILED DESCRIPTION OF THE PREFERRED EMBODIMENTS

Figure 1:
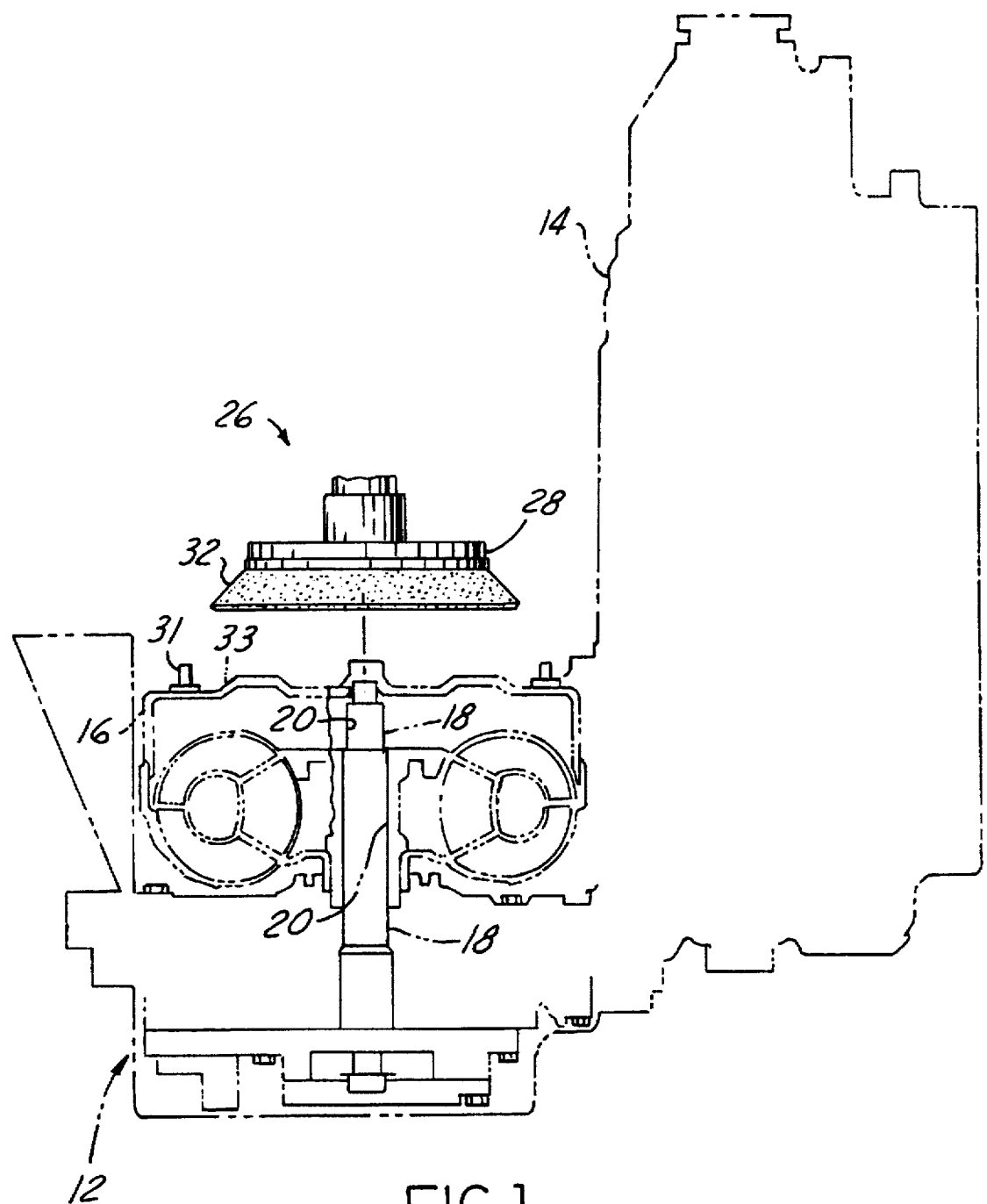
FIG. 1 is a side view, in partial section, of a typical automatic transmission showing a portion of the robot end effector after releasing a torque converter in the installed position.

During assembly of an automatic transmission 12, a torque converter 16 must be assembled to a transmission subassembly 14. As torque converter 16 is assembled to transmission subassembly 14, three concentric external splines 18 on transmission subassembly 14 must slide into and engage three mating internal splines 20 in torque converter 16. Most of the splines 18 and 20 are free to independently rotate, which makes aligning and maintaining alignment of the splines during assembly difficult. Thus, automated assembly using conventional robots is generally difficult and expensive. The following disclosed apparatus and method allow for alignment and mating of splines 18 and 20 during assembly of torque converter 16 to transmission subassembly 14.

Figures 2, 3:
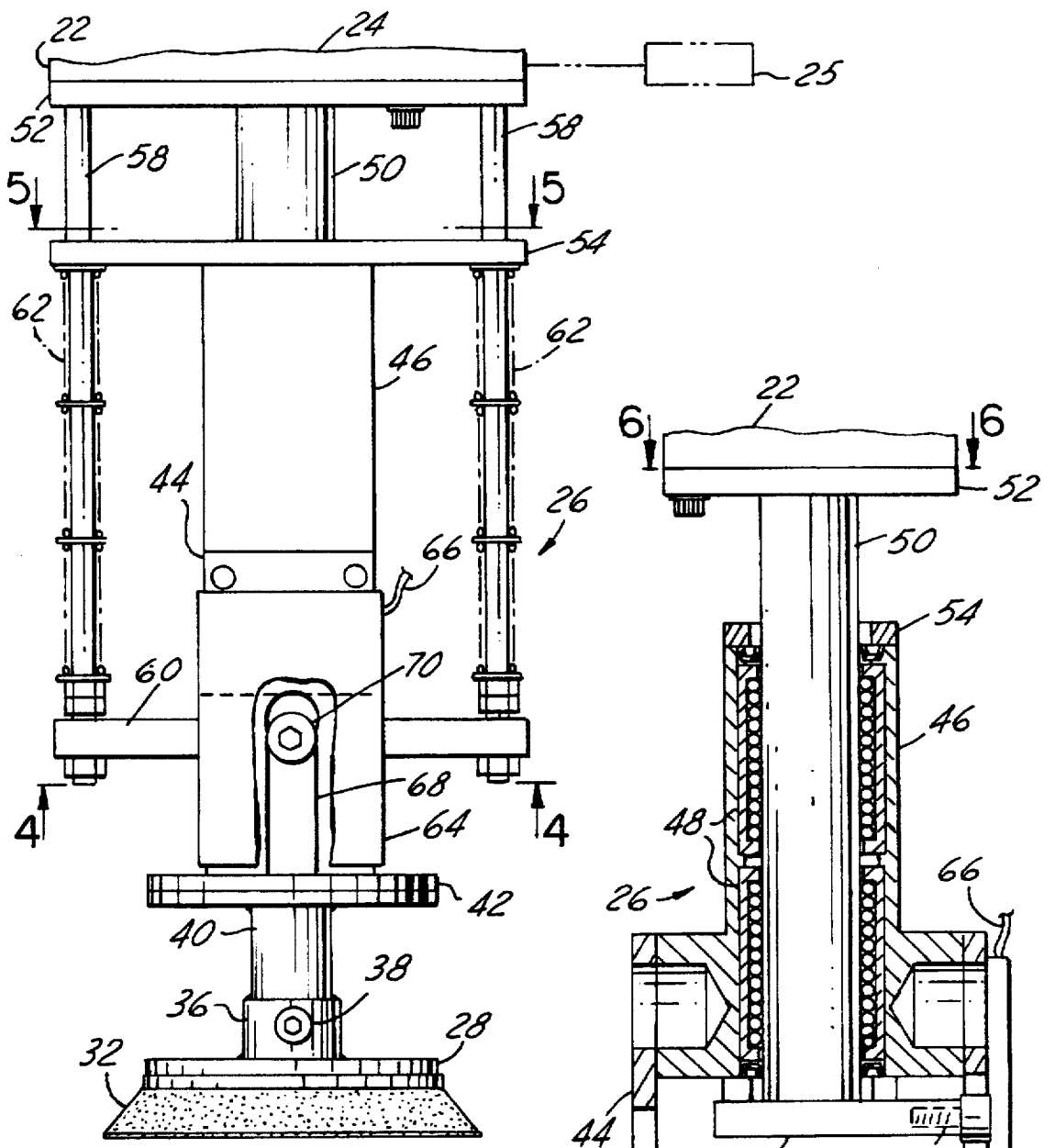
FIG. 2 is a side view, in partial section, of an end effector for supporting a torque converter.
FIG. 3 is a side view, rotated 90 degrees, of the end effector of FIG. 2.
Figure 4:
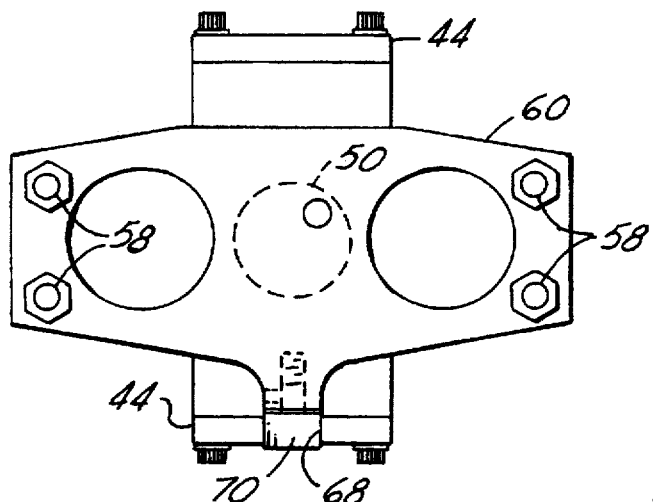
FIG. 4 is a view taken along line 4—4 in FIG. 2, rotated 180 degrees, with the position sensor not shown.
Figure 5:
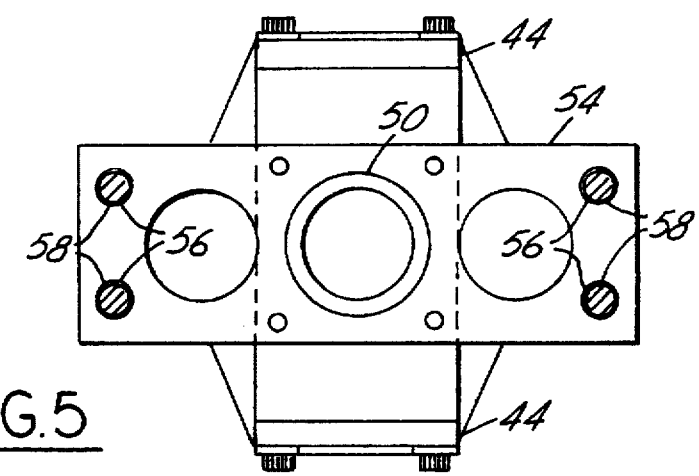
FIG. 5 is a view taken along line 5—5 in FIG. 2.
Figure 6:
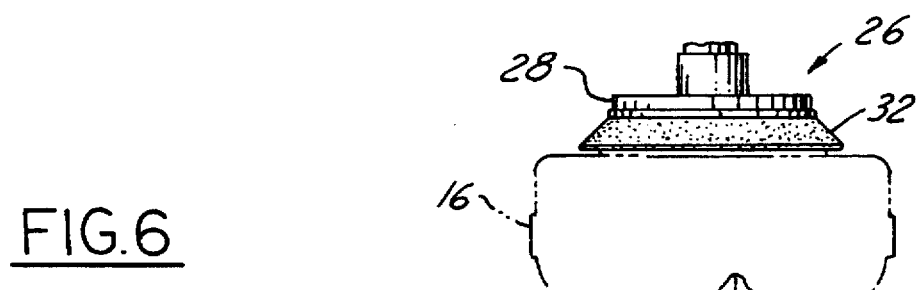
FIG. 6 is a view taken along line 6—6 in FIG. 3, rotated 90 degrees.
Figure 6:
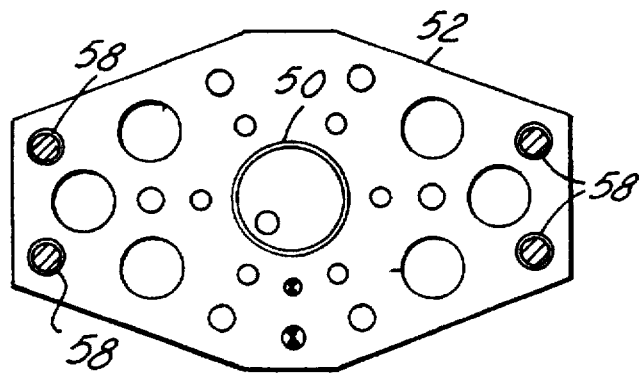

An arm 22 of a conventional robot 24 is connected to an end effector assembly 26. Robot 24 is electrically connected to a conventional electronic controller 25, shown schematically in FIG. 2.

End effector assembly 26 includes a lower plate 28 with a rubber vacuum cup 32 attached to its underside. Vacuum cup 32 is sized to mate with a circular protrusion 33 on torque converter 16. A central vacuum hole 34, through vacuum cup 32, connects to a hollow tube 36 protruding through lower plate 28, which, in turn, connects to a connector 38 for a conventional vacuum line leading to a conventional vacuum mechanism, not shown. Hollow tube 36 is affixed to a support shaft 40, which is, in turn, affixed to an intermediate plate 42.

Two vertical support plates 44 mount on top of intermediate plate 42. Vertical support plates 44 are, in turn, affixed to a lower support shaft 46. Lower support shaft 46 is coupled, through ball bearing assemblies 48, to an upper support shaft 50. Upper support shaft 50 is secured to robot connector plate 52, which is mounted to robot arm 22. Lower support shaft 46, includes an upper spring plate 54, which has four spring shaft holes 56 through it that each receive one of four spring retainer shafts 58. The four spring retainer shafts 58 are fastened to robot connector plate 52 at one end and a lower spring plate 60. Lower spring plate 60 is affixed to the bottom end of upper support shaft 50. Mounted between upper and lower spring plates 54 and 60 around spring retainer shafts 58 are spring assemblies 62, each made up of a series of compression springs and washers. Other counter balance mechanisms other than the spring assembly arrangement can be used, such as a pneumatic cylinder counterbalance.

A position (distance) sensor 64 is mounted to one of the vertical support plates 44. A sensor wire 66 electrically connects sensor 64 to robot electronic controller 25. The vertical support plate 44 that sensor 64 is mounted to includes a sensor slot 68, and lower spring plate 60 includes a cam follower 70 affixed to it that has a diameter matching the width of slot 68.

Figure 7:
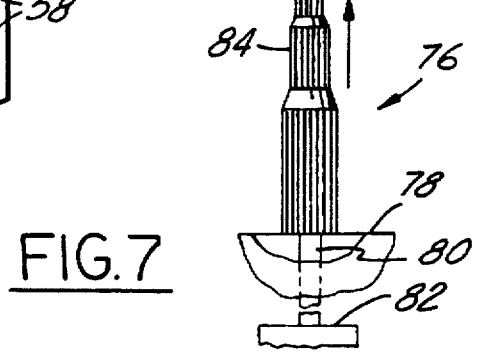
FIG. 7 is a side view of an alignment tool assembly.

In addition to end effector assembly 26, an alignment tool assembly 76 may also be employed, as shown in FIG. 7. Alignment tool assembly 76 includes a base 78 and a push-rod 80 telescopically protruding through a bore in base 78. Connected to one end of push-rod 80 is a movement mechanism 82, and connected to the other end of push-rod 80 is an alignment tool 84. Alignment tool 84 includes three portions of varying diameter that match a corresponding diameter and spacing of internal splines 20 in torque converter 16.

The method of assembling torque converter 16 to transmission subassembly 14 will now be described. Controller 25 causes robot 24 to move end effector assembly 26 over to the next torque converter 16 to be assembled and vacuum cup 32 is properly aligned over circular protrusion 33. End effector assembly 26 is lowered onto torque converter 16 and the conventional vacuum mechanism is activated so that vacuum cup 32 secures itself to torque converter 16. Maintaining the vacuum pressure, robot 24 lifts torque converter 16 and moves it over to the vicinity of transmission subassembly 14, generally centered above external splines 18.

At this point, intermediate plate 42, which is affixed to vacuum cup 32 through support shaft 40 and lower plate 28, is supported by lower support shaft 46 through vertical support plates 44. Lower support shaft 46 is, in turn, supported on spring assemblies 62 through upper spring plate 54. These spring assemblies 62 will act as counterbalances to reduce the effective weight of torque converter 16 when it comes into contact with transmission subassembly 14. The spring counterbalances can be adjusted based on the weight of the part and the nature of the splines that require alignment. This will allow for an overall flexible connection between robot arm 22 and vacuum cup 32.

Robot 24 then lowers end effector assembly 26 and, consequently, torque converter 16 downward toward external splines 18. Distance sensor 64 senses the location of cam follower 70 in sensor slot 68. As long as the cam follower 70 remains substantially at this location, robot 24 will continue to lower torque converter 16. If, by chance, all three external splines 18 were perfectly aligned with their corresponding internal splines 20, then robot 24 will continue lowering torque converter 16 until it is completely seated in transmission subassembly 14.

At this point, torque converter 16 will cease to move downward with end effector assembly 26. This, in turn, will cause cam follower 70 to move downward relative to sensor slot 68, since it is affixed to upper support shaft 50 that is still lowering along with the upper portion of end effector assembly 26. When cam follower 70 has moved a predetermined distance relative to sensor slot 68, sensor 64 will signal to robot controller 25 to cease lowering end effector assembly 26. Controller 25 at this point will determine how far the end of robot arm 22 connected to end effector 26 has moved downward. If it has moved more than a predetermined distance, torque converter 16 will be considered properly seated and the vacuum in vacuum cup 32 will be released. End effector 26 will then be pulled away from torque converter 16 and moved over to the next torque converter 16.

On the other hand, if end effector assembly 26 is generally aligned over external splines 20, and if the top-most external spline 18 is not aligned with the first internal spline 20, as robot 24 lowers end effector assembly 26, these two splines will contact one another. Damage to the splines from this contact is prevented by the resilience in the spring assemblies 62. The contact will prevent torque converter 16 from continuing to lower as the upper portion of end effector assembly 26 continues to be lowered. Cam follower 70 will move downward relative to sensor slot 68 until it reaches a predetermined distance.

At this point, sensor 64 will send a signal to controller 25 to stop robot 24 from lowering end effector 26. Controller will also determined the distance that robot arm 22 has lowered. If it is less than a predetermined distance, controller 25 will assume that torque converter 16 is not fully seated due to spline misalignment. This position type of feedback, then, is used to determine if the corresponding splines have been aligned.

Spring assemblies 62, acting as counterbalances, in effect, decouple the rigid robot 24 from the rigid transmission splines and avoid robotic faults through drive overloads and prevent damage to the splines during this placement process by avoiding hard spline-to-spline contact. Particularly for heavier torque converters that weigh in the range of 35 pounds or more. Without this cushion feature, robot 24 could fault bringing the assembly process to a halt and forcing manual intervention. The reduced weight is important to the spline alignment process in that some splines rotate with little friction, resulting in a non-aligned "locked" condition if the full weight of torque converter 16 is pushing down on the splines that need to be aligned.

Robot controller 25 does a lift, rotate and drop procedure with torque converter 16 until the matching splines are aligned. When they do become aligned, torque converter 16 is free to drop down, mating the two splines. As torque converter 16 drops, the distance sensor 64 detects the vertical displacement of cam follower 70 relative to sensor slot 68. Sensor 64, in effect, detects alignment of the current splines based on the vertical displacement. This signals controller 25 that the first set of splines are aligned.

The process now shifts downward to align subsequent splines. Again controller 25 causes robot 24 to begin moving downward until cam follower 70 moves the predetermined distance relative to sensor slot 68, and then stops robot 24 from moving downward. Controller 25 again determines if torque converter 16 is fully seated by determining if the distance that robot arm 22 has moved downward is greater than a predetermined distance. If it is, then torque converter 16 is considered seated and the process continues as in the first instance when all of the splines were aligned. If not, then the process of lift, rotate and lower is repeated until the next set of splines are aligned as described for the first set.

This continues for the subsequent set of mating splines, until controller 25 determines that torque converter 16 is fully seated in transmission subassembly 14, meaning that all splines have been aligned. The process now continues as described above for a fully seated torque converter 16. In this way, the process and equipment automatically places and aligns each individual spline during transmission component assembly.

Alignment tool assembly 76 can also be used to pre-align torque converter splines 20 concentrically before assembly to transmission subassembly 14. This desire for concentricity in alignment is due to the fact that splines 20 in torque converter 16 can move relative to one another in a planar manner. In this case, before alignment of torque converter 16 over external splines 18, robot 24 aligns internal splines 20 of torque converter 16 over alignment tool assembly 76. Movement mechanism 82 lifts alignment tool 84 up into internal splines 20 and lowers back down. In this way, concentric alignment can be achieved. However, the trade-off is the slightly increased cycle time for this extra step in the assembly process, although this is still less time consuming than complete concentric and rotational alignment and maintenance of both the internal and external splines before automated assembly.

While certain embodiments of the present invention have been described in detail, those familiar with the art to which this invention relates will recognize various alternative designs and embodiments for practicing the invention as defined by the following claims.

I claim:

1. An automated method of aligning splines of a torque converter with splines of a vehicle automatic transmission subassembly while assembling the torque converter to the transmission subassembly using an end effector assembly connected to an arm of a robot, the method comprising the steps of:

positioning the transmission subassembly with the splines extending upwards in a substantially vertical direction;

engaging the torque converter with the end effector assembly;

positioning the torque converter over the transmission subassembly with the splines of the torque converter substantially centered over the splines of the transmission subassembly;

providing a counterbalance mechanism in the end effector assembly such that a limited amount of relative movement can occur between the robot arm and the torque converter and the torque converter is resiliently supported relative to the robot arm; said counterbalance mechanism including spring assemblies providing sensing means such that the sensing means detects relative vertical position between the robot arm and torque converter;

lowering the torque converter down onto the transmission subassembly until the sensing means detects a vertical change in relative position between the robot arm and torque converter;

lifting the torque converter, rotating the torque converter and lowering the torque converter if the robot arm has not dropped a predetermined distance indicating full seating of the torque converter on the transmission subassembly until the sensing means detects a vertical change in relative position between the robot arm and torque converter; and repeating the lowering step and the lifting, rotating and lowering step until the robot arm has dropped the predetermined distance indicating a full seating of the torque converter.

2. A method according to claim 1 further including the steps of:

providing a pre-alignment tool assembly having alignment tools with diameters and lengths generally matching that of the torque converter splines; and inserting the pre-alignment tool assembly to align said torque converter splines and removing it from the torque converter splines whereby the torque converter splines are generally aligned with the transmission subassembly splines prior to lowering the torque converter.

* * * * *